United States Patent
Lee et al.

(10) Patent No.: US 10,230,439 B2
(45) Date of Patent: Mar. 12, 2019

(54) CODING METHOD FOR CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Hyunho Lee, Seoul (KR); Daesung Hwang, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/744,619

(22) PCT Filed: Sep. 20, 2016

(86) PCT No.: PCT/KR2016/010467
§ 371 (c)(1),
(2) Date: Jan. 12, 2018

(87) PCT Pub. No.: WO2017/048111
PCT Pub. Date: Mar. 23, 2017

(65) Prior Publication Data
US 2018/0234147 A1 Aug. 16, 2018

Related U.S. Application Data

(60) Provisional application No. 62/221,093, filed on Sep. 20, 2015.

(51) Int. Cl.
*H04B 1/38* (2015.01)
*H04L 5/16* (2006.01)
(Continued)

(52) U.S. Cl.
CPC ......... *H04B 7/0478* (2013.01); *H04B 7/0626* (2013.01); *H04B 7/0639* (2013.01);
(Continued)

(58) Field of Classification Search
CPC .. H04B 7/0478; H04B 7/0639; H04B 7/0626; H04L 1/0026; H04L 1/0073; H04W 72/0413
(Continued)

(56) References Cited

U.S. PATENT DOCUMENTS

2014/0010188 A1 * 1/2014 Li .................. H04L 1/0073
370/329
2014/0071848 A1 3/2014 Park et al.

FOREIGN PATENT DOCUMENTS

WO  WO 2014/131031 A1  8/2014

OTHER PUBLICATIONS

CATT, "Periodic Feedback for Non-precoded CSI-RS," 3GPP TSG RAN WG1 Meeting #82, R1-153943, Beijing, China, Aug. 24-28, 2015 (Aug. 15, 2015), 2 pages.
(Continued)

*Primary Examiner* — Phuong Phu
(74) *Attorney, Agent, or Firm* — Birch, Stewart, Kolasch & Birch, LLP

(57) ABSTRACT

A method for a channel coding of channel state information (CSI) in a wireless communication system according to an embodiment of the present invention may comprise the steps of: determining whether to perform an individual coding or a joint coding on a multi-CSI for a CSI process or a plurality of cells to be transmitted in one subframe; and performing a channel coding on an input bit for the multi-CSI according to the determined coding scheme, wherein whether to perform the individual coding or the joint coding may be determined according to a rule set for each individual CSI,
(Continued)

for each physical uplink control channel (PUCCH) reporting type, or for each PUCCH reporting mode.

16 Claims, 8 Drawing Sheets

(51) Int. Cl.
    *H04B 7/0456*     (2017.01)
    *H04L 1/00*     (2006.01)
    *H04L 1/06*     (2006.01)
    *H04B 7/06*     (2006.01)
    *H04W 72/04*     (2009.01)

(52) U.S. Cl.
    CPC .............. *H04L 1/00* (2013.01); *H04L 1/0026* (2013.01); *H04L 1/06* (2013.01); *H04W 72/0413* (2013.01)

(58) Field of Classification Search
    USPC ................................ 375/346, 219, 220, 222
    See application file for complete search history.

(56) References Cited

OTHER PUBLICATIONS

Huawei et al., "Periodic CSI Feedback Enhancement for Carrier Aggregation Enhancement Beyond 5," 3GPP TSG RAN WG1 Meeting #82, R1-153773, Beijing, China, Aug. 24-28, 2015 (Aug. 15, 2015), 6 pages.
ZTE, "CSI Enhancement for CA with up to 32 CCs," 3GPP TSG RAN WG1 Meeting #82, R1-154031, Beijing, China, Aug. 24-28, 2015 (Aug. 15, 2015), 2 pages.

\* cited by examiner

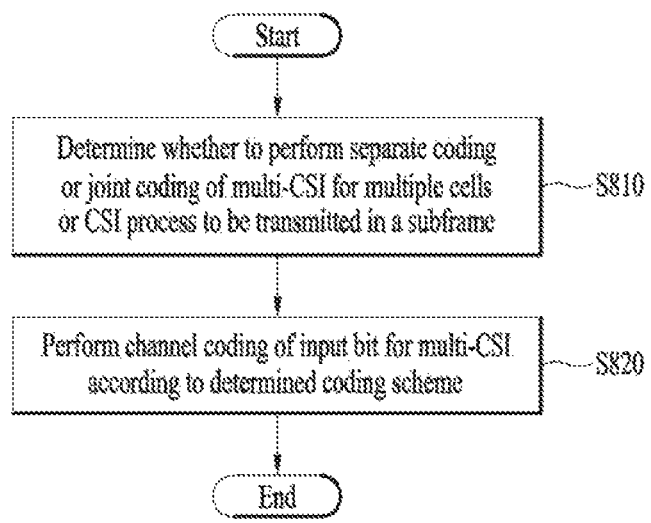
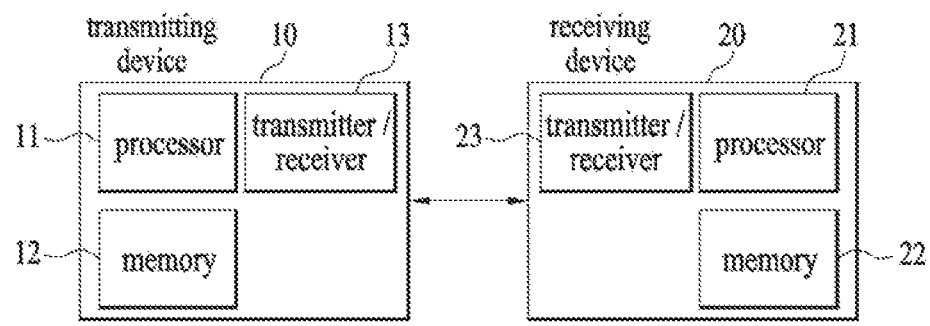

CODING METHOD FOR CHANNEL STATE INFORMATION IN WIRELESS COMMUNICATION SYSTEM, AND APPARATUS THEREFOR

CROSS REFERENCE TO RELATED APPLICATIONS

This application is the National Phase of PCT International Application No. PCT/KR2016/010467, filed on Sep. 20, 2016, which claims priority under 35 U.S.C. 119(e) to U.S. Provisional Application No. 62/221,093, filed on Sep. 20, 2015, all of which are hereby expressly incorporated by reference into the present application.

TECHNICAL FIELD

The present invention relates to a wireless communication system, and more particularly, to a coding method for channel state information in a wireless communication system and an apparatus therefor.

BACKGROUND ART

In a cellular communication system, a base station controls transmission and reception of data transceived with a plurality of user equipments and transmits scheduling information (e.g., time/frequency on which data is to be transmitted, MCS (modulation and coding scheme), HARQ (hybrid automatic retransmission request)-related information on downlink data transmitted to a user equipment) to the user equipment to enable the user equipment to receive data. Similarly, the base station informs the user equipment of uplink scheduling information to enable the user equipment to transmit uplink data. Recently, in order to support a wider bandwidth while utilizing a legacy band distinction, a CA (carrier aggregation) technology has been introduced to transmit downlink data to a single UE by aggregating unit CC (component carrier). In particular, LTE standard considers a self-CC scheduling technology that each cell transmits a control channel including scheduling information and a cross-CC scheduling technology that a cell transmits a control channel including scheduling information of a different cell in a situation that a plurality of CCs (component carriers) of a different duplex mode or the same duplex mode are aggregated. Although a current LTE standard considers CA that transmits downlink data by aggregating 5 CCs, recently, in order to support rapidly increasing traffic load, CA enhancement for transmitting downlink data by aggregating 5 or more CCs (e.g., 8, 16, 32 CCs) is considering. In this case, it is anticipated that the number of bits for UCI such as HARQ-ACK (acknowledgement), CSI (channel state information), and the like is to be rapidly increased. If an error occurs in performing transmission and detection, it may have a great ripple effect due to the error.

DISCLOSURE OF THE INVENTION

Technical Task

A technical task of the present invention is to propose a method of performing coding on channel state information in a wireless communication system and an operation therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing channel coding of channel state information (CSI) in a wireless communication system, being performed by a terminal and including determining whether to perform separate coding or joint coding on multi-CSI for a plurality of cells or a CSI process to be transmitted in a subframe and performing channel coding of input bits for the multi-CSI according to the determined coding scheme. In this case, whether to perform the separate coding or the joint coding may be determined according to a rule configured per individual CSI, per physical uplink control channel (PUCCH) reporting type, or per PUCCH reporting mode.

Additionally or alternatively, when whether to perform the separate coding or the joint coding is determined according to a rule configured per individual CSI, a type of CSI having a bit width being changed according to a rank value of a downlink channel may be separately coded. A type of CSIs having a bit width being not changed according to a rank value of a downlink channel may be jointly coded.

Additionally or alternatively, when whether to perform the separate coding or the joint coding is determined according to a rule configured per individual CSI, a type of CSI having the number of final input bits for a channel coder or the number of coded bits being pre-configured and having a bit width being changed according to a rank value of a downlink channel may be jointly coded. A type of CSI having the number of final input bits for a channel coder or the number of coded bits being not pre-configured and having a bit width being changed according to a rank value of a downlink channel may be separately coded.

Additionally or alternatively, when whether to perform the separate coding or the joint coding is determined according to a rule configured per individual CSI, a type of CSI having a bit width being not changed according to a rank value of a downlink channel, which is simultaneously transmitted with a different CSI having a bit width being changed according to a rank value of a downlink channel, is jointly coded. A type of CSI having a bit width being not changed according to a rank value of a downlink channel, which affects information to be delivered later, may be separately coded.

Additionally or alternatively, when whether to perform the separate coding or the joint coding is determined according to a rule configured per PUCCH reporting type or per PUCCH reporting mode, a PUCCH reporting type of CSI or a PUCCH reporting mode of CSI of which a bit width is changed according to a rank value of a downlink channel may be separately coded. A PUCCH reporting type of CSI or a PUCCH reporting mode of CSI of which a bit width is not changed according to a rank value of a downlink channel may be jointly coded.

Additionally or alternatively, when whether to perform the separate coding or the joint coding is determined according to a rule configured per PUCCH reporting type or per PUCCH reporting mode, a PUCCH reporting type of CSI or a PUCCH reporting mode of CSI having the number of final input bits for a channel coder or the number of coded bits being pre-configured and having a bit width being changed according to a rank value of a downlink channel may be jointly coded. A PUCCH reporting type of CSI or a PUCCH reporting mode of CSI having the number of final input bits for a channel coder or the number of coded bits being not pre-configured and having a bit width being changed according to a rank value of a downlink channel may be separately coded.

Additionally or alternatively, when whether to perform the separate coding or the joint coding is determined according to a rule configured per PUCCH reporting type or per PUCCH reporting mode, a type of CSI having a bit width being not changed according to a rank value of a downlink channel, which is simultaneously transmitted with a different CSI having a bit width being changed according to a rank value of a downlink channel, may be jointly coded. A type of CSI having a bit width being not changed according to a rank value of a downlink channel, which affects information to be delivered later, may be separately coded.

Additionally or alternatively, whether to perform the separate coding or the joint coding can be determined according to a rule configured per combination of all or a part of a PUCCH reporting type, a PUCCH reporting mode, and the number of antenna ports.

Additionally or alternatively, if whether to perform the separate coding or the joint coding is determined according to a rule configured per PUCCH reporting type or per PUCCH reporting mode, an individual cyclic redundancy check (CRC) bit may be attached to each of CSIs corresponding to a part of PUCCH reporting types or a part of PUCCH reporting modes.

Additionally or alternatively, when whether to perform the separate coding or the joint coding is determined according to a rule configured per PUCCH reporting type or per PUCCH reporting mode, a single cyclic redundancy check (CRC) bit may be attached to CSIs corresponding to a part of PUCCH reporting types or a part of PUCCH reporting modes.

To further achieve these and other advantages and in accordance with the purpose of the present invention, according to a different embodiment, a terminal configured to perform channel coding of channel state information (CSI) in a wireless communication system includes a transmitter and receiver, and a processor that controls the transmitter and the receiver, the processor determines whether to perform separate coding or joint coding of multi-CSI for a plurality of cells or a CSI process to be transmitted in a subframe, performs channel coding of input bits for the multi-CSI according to the determined coding scheme. In this case, whether to perform the separate coding or the joint coding may be determined according to a rule configured per individual CSI, per physical uplink control channel (PUCCH) reporting type, or per PUCCH reporting mode.

Additionally or alternatively, when whether to perform the separate coding or the joint coding is determined according to a rule configured per individual CSI, a type of CSI having a bit width being changed according to a rank value of a downlink channel may be separately coded. A type of CSIs having a bit width being not changed according to a rank value of a downlink channel may be jointly coded.

Additionally or alternatively, when whether to perform the separate coding or the joint coding is determined according to a rule configured per individual CSI, a type of CSI having the number of final input bits for a channel coder or the number of coded bits being pre-configured and having a bit width being changed according to a rank value of a downlink channel may be jointly coded. A type of CSI having the number of final input bits for a channel coder or the number of coded bits being not pre-configured and having a bit width being changed according to a rank value of a downlink channel may be separately coded.

Additionally or alternatively, when whether to perform the separate coding or the joint coding is determined according to a rule configured per individual CSI, a type of CSI having a bit width being not changed according to a rank value of a downlink channel, which is simultaneously transmitted with a different CSI having a bit width being changed according to a rank value of a downlink channel, may be jointly coded. A type of CSI having a bit width being not changed according to a rank value of a downlink channel, which affects information to be delivered later, may be separately coded.

Additionally or alternatively, when whether to perform the separate coding or the joint coding is determined according to a rule configured per PUCCH reporting type or per PUCCH reporting mode, a PUCCH reporting type of CSI or a PUCCH reporting mode of CSI of which a bit width is changed according to a rank value of a downlink channel may be separately coded. A PUCCH reporting type of CSI or a PUCCH reporting mode of CSI of which a bit width is not changed according to a rank value of a downlink channel may be jointly coded.

Additionally or alternatively, when whether to perform the separate coding or the joint coding is determined according to a rule configured per PUCCH reporting type or per PUCCH reporting mode, a PUCCH reporting type of CSI or a PUCCH reporting mode of CSI having the number of final input bits for a channel coder or the number of coded bits being pre-configured and having a bit width being changed according to a rank value of a downlink channel may be jointly coded. If a PUCCH reporting type of CSI or a PUCCH reporting mode of CSI having the number of final input bits for a channel coder or the number of coded bits being not pre-configured and a bit width being changed according to a rank value of a downlink channel may be separately coded.

Additionally or alternatively, when whether to perform the separate coding or the joint coding is determined according to a rule configured per PUCCH reporting type or per PUCCH reporting mode, a type of CSI having a bit width being not changed according to a rank value of a downlink channel, which is simultaneously transmitted with a different CSI having a bit width being changed according to a rank value of a downlink channel, may be jointly coded. A type of CSI having a bit width being not changed according to a rank value of a downlink channel, which affects information to be delivered later, may be separately coded.

Additionally or alternatively, whether to perform the separate coding or the joint coding can be determined according to a rule configured per combination of all or a part of a PUCCH reporting type, a PUCCH reporting mode, and the number of antenna ports.

Additionally or alternatively, when whether to perform the separate coding or the joint coding is determined according to a rule configured per PUCCH reporting type or per PUCCH reporting mode, a single cyclic redundancy check (CRC) bit may be attached to CSIs corresponding to a part of PUCCH reporting types or a part of PUCCH reporting modes.

Additionally or alternatively, when whether to perform the separate coding or the joint coding is determined according to a rule configured per PUCCH reporting type or per PUCCH reporting mode, an individual cyclic redundancy check (CRC) bit may be attached to each of CSIs corresponding to a part of PUCCH reporting types or a part of PUCCH reporting modes.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently perform coding on channel state information and report the channel state information in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a flowchart illustrating an operation according to one embodiment of the present invention;

FIG. 9 is a block diagram of a device for implementing embodiment(s) of the present invention.

BEST MODE

Mode for Invention

Figure 1:
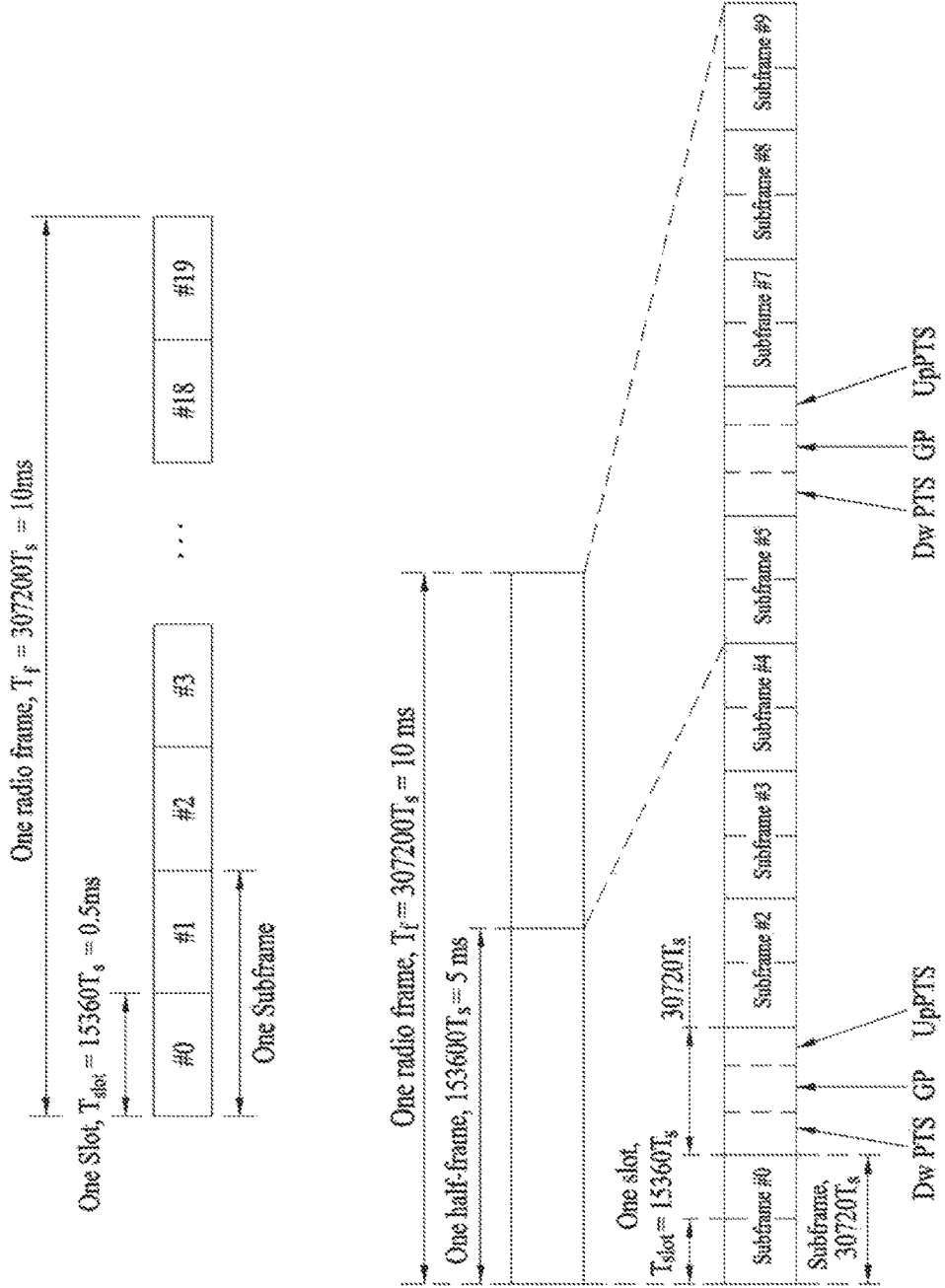
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource.

Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 1-continued

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | 6592 · $T_s$  | | 2192 · $T_s$ | 2560 · $T_s$ | 7680 · $T_s$  | 2192 · $T_s$ | 2560 · $T_s$ |
| 1 | 19760 · $T_s$ | | | | 20480 · $T_s$ | | |
| 2 | 21952 · $T_s$ | | | | 23040 · $T_s$ | | |
| 3 | 24144 · $T_s$ | | | | 25600 · $T_s$ | | |
| 4 | 26336 · $T_s$ | | | | 7680 · $T_s$  | 4384 · $T_s$ | 5120 · $T_s$ |
| 5 | 6592 · $T_s$  | | 4384 · $T_s$ | 5120 · $T_s$ | 20480 · $T_s$ | | |
| 6 | 19760 · $T_s$ | | | | 23040 · $T_s$ | | |
| 7 | 21952 · $T_s$ | | | | 12800 · $T_s$ | | |
| 8 | 24144 · $T_s$ | | | | — | — | — |
| 9 | 13168 · $T_s$ | | | | — | — | — |

Figure 2:
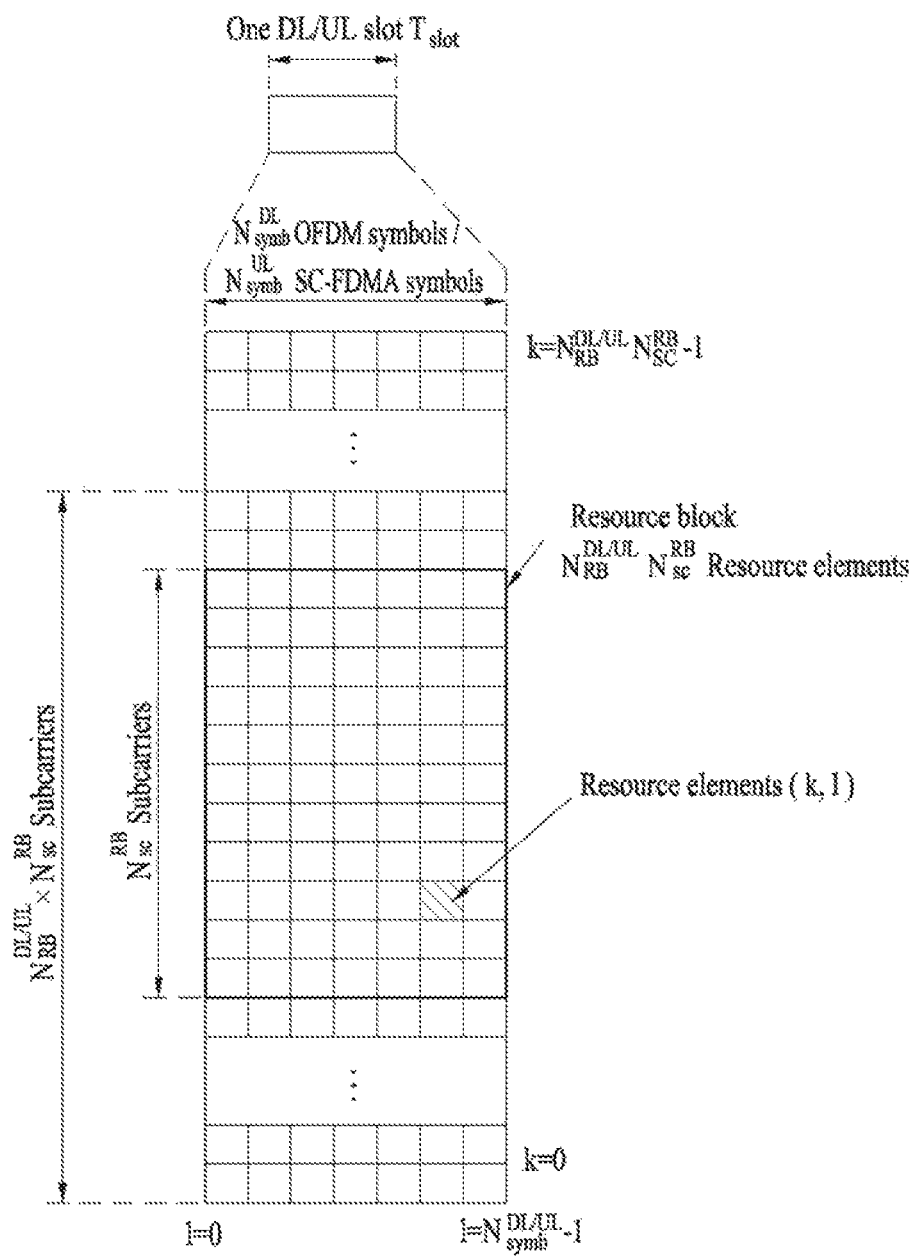
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{symb}^{UL}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
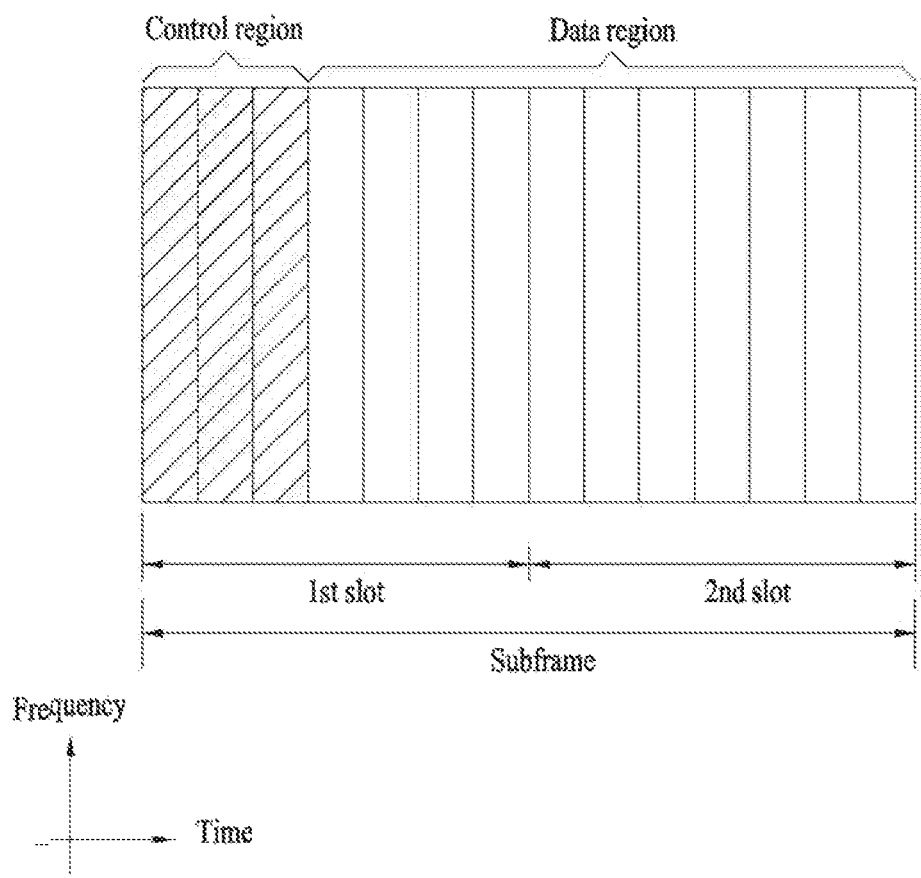
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
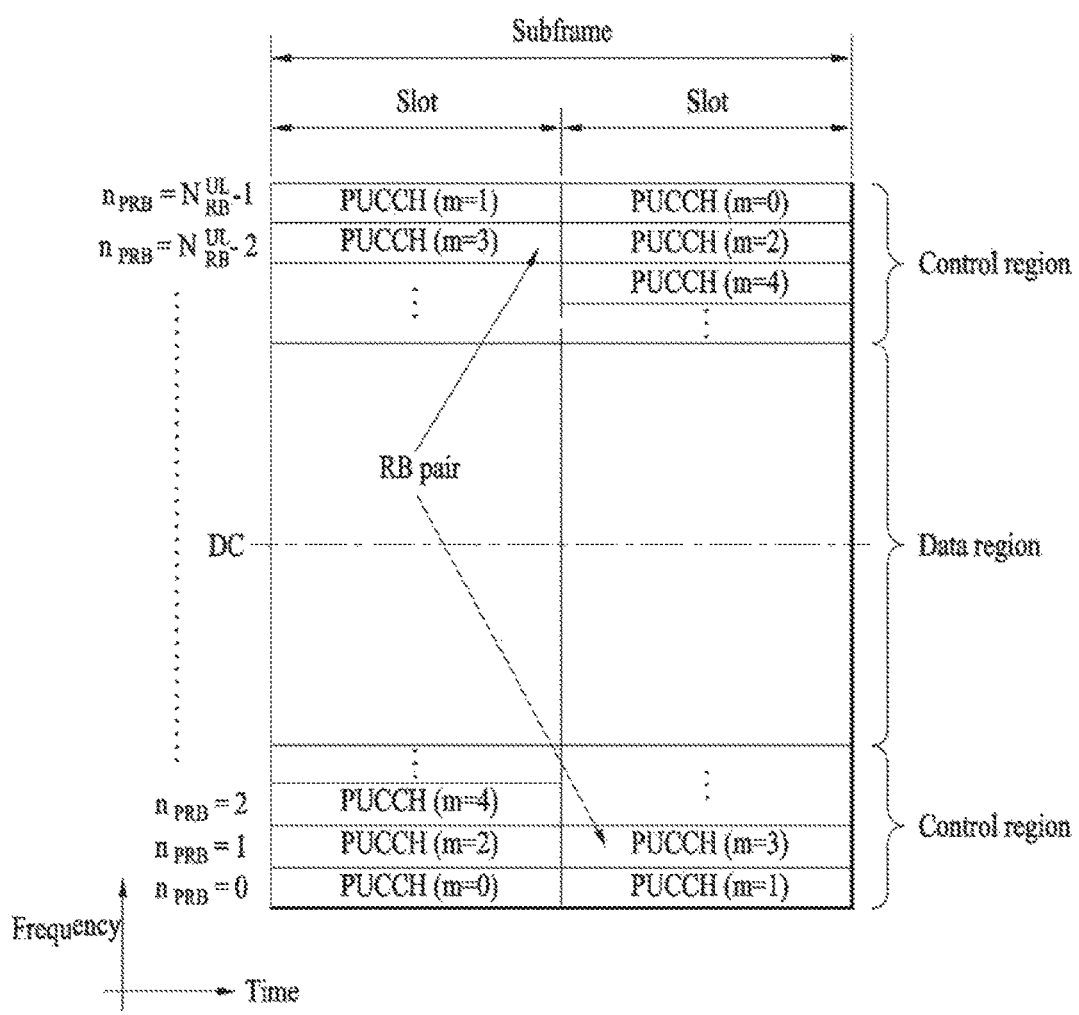
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be a periodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2<br>RI<br>1st wideband CQI (4 bit)<br>2nd wideband CQI (4 bit)<br>if RI > 1<br>N * Subband PMI (4 bit)<br>(N is the total # of subbands)<br>(if 8Tx Ant,<br>N * subband W2 + wideband W1) |
| | UE selected (Subband CQI) | Mode 2-0<br>RI (only for Open-loop SM)<br>1st wideband CQI (4 bit) + Best-M CQI (2 bit)<br>(Best-M CQI: An average CQI for M SBs selected from among N SBs)<br>Best-M index (L bit) | | Mode 2-2<br>RI<br>1st wideband CQI (4 bit) + Best-M CQI (2 bit)<br>2nd wideband CQI (4 bit) + Best-M CQI (2 bit) if RI > 1<br>Best-M index (L bit)<br>Wideband PMI (4 bit) + Best-M PMI (4 bit)<br>(if 8Tx Ant,<br>wideband W2 + Best-M W2 + wideband W1) |
| | Higher Layer-configured (Subband CQI) | Mode 3-0<br>RI (only for Open-loop SM)<br>1st wideband CQI (4 bit) + N * subband CQI (2 bit) | Mode 3-1<br>RI<br>1st wideband CQI (4 bit) + N * subbandCQI (2 bit)<br>2nd wideband CQI (4 bit) + N * subbandCQI (2 bit)<br>if RI > 1<br>Wideband PMI (4 bit)<br>(if 8Tx Ant,<br>wideband W2 + wideband W1) | Mode 3-2<br>RI<br>1st wideband CQI (4 bit) + N * subbandCQI (2 bit)<br>2nd wideband CQI (4 bit) + N * subbandCQI (2 bit)<br>if RI > 1<br>N * Subband PMI (4 bit)<br>(N is the total # of subbands)<br>(if 8Tx Ant,<br>N * subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
|---|---|
| '00' | No aperiodic CSI report is triggered |
| '01' | Aperiodic CSI report is triggered for a serving cell |
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
|---|---|
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

In a cellular communication system, a base station controls transmission and reception of data transceived with a plurality of user equipments and transmits scheduling information (e.g., time/frequency on which data is to be transmitted, MCS (modulation and coding scheme), HARQ (hybrid automatic retransmission request)-related information on downlink data transmitted to a user equipment) to the user equipment to enable the user equipment to receive data. Similarly, the base station informs the user equipment of uplink scheduling information to enable the user equipment to transmit uplink data. Recently, in order to support a wider bandwidth while utilizing a legacy band distinction, a CA (carrier aggregation) technology has been introduced to transmit downlink data to a single UE by aggregating unit CC (component carrier). In particular, LTE standard considers a self-CC scheduling technology that each cell transmits a control channel including scheduling information and a cross-CC scheduling technology that a cell transmits a control channel including scheduling information of a different cell in a situation that a plurality of CCs (component carriers) of a different duplex mode or the same duplex mode are aggregated. Although a current LTE standard considers CA that transmits downlink data by aggregating 5 CCs, recently, in order to support rapidly increasing traffic load, CA enhancement for transmitting downlink data by aggregating 5 or more CCs (e.g., 8, 16, 32 CCs) is considering. In this case, it is anticipated that the number of bits for UCI such as HARQ-ACK (acknowledgement), CSI (channel state information), and the like is to be rapidly increased. If an error occurs in performing transmission and detection, it may have a great ripple effect due to the error.

The present invention proposes a coding method when CSI on a plurality of DL cells and/or HARQ-ACK information on (TBs (transport blocks) of) a plurality of DL cells are multiplexed to a PUCCH resource and simultaneously transmitted in a single subframe in a situation that a plurality of CCs (component carriers) are aggregated in a different duplex mode or the same duplex mode. In the following, for clarity, the proposed scheme is explained on the basis of 3GPP LTE system. Yet, a system range to which the proposed scheme is applied can be extended to a different system rather than 3GPP LTE system.

According to a legacy 3GPP LTE Rel-10, a plurality of cells can be aggregated and CSI (channel state information) on an activated cell can be transmitted via a PUCCH resource or a PUSCH resource. When CSI on a single cell or a plurality cells is periodically reported, a collision may occur in the same subframe between the CSI reports. In this case, single CSI report is selected according to a reporting type and a priority of a cell and the remaining CSI information is dropped. If the number of cells corresponding to a target of CA is increased, the number of CSI reports is also increased. In this case, due to excessive CSI drop, DL throughput capability can be deteriorated. Hence, in order to solve or reduce the problem, a next system considers transmitting a plurality of periodic CSI reports at the same time in the same subframe.

According to a current standard, a CQI and a bit width of a precoding information field can be changed according to conditions described in the following.

TM

Whether or not PMI/RI report is set

Number of antenna ports

Rank value

Whether or not 4Tx enhanced codebook is set (by alternativeCodebookEnabledFor4Tx-r12)

In particular, if an eNB misses CSI feedback corresponding to an RI, the eNB is unable to correctly anticipate a CQI and a bit width of a precoding information field. The eNB may infer CQI/PMI by performing a plurality of blind detections or determine that CQI/PMI is not valid. Yet, when multiple periodic CSI corresponding to a plurality of cells or CSI processes are transmitted on a single PUCCH, if an RI corresponding to a plurality of cells or CSI processes is missed or a decoding error occurs, it is expected that the eNB has difficulty in comprehending corresponding information due to size ambiguity for CQI of a corresponding cell/CSI process and a precoding information field.

For example, when RI feedback on cells 1, 2, and 3 is transmitted on PUCCH in an SF #n and CQI and/or PMI feedback on cells 1, 2, and 3 is transmitted on PUCCH in an SF #(n+k), a bit width for each cell is shown in Table 10. When the RI feedback on cells 1, 2, and 3 is transmitted in the SF #n, if a decoding error occurs, it is difficult for an eNB to anticipate a bit width for the CQI and/or PMI feedback on cells 1, 2, and 3 in the SF #(n+k) or blind detection count is rapidly increased (compared to a case of transmitting single periodic CSI only). Consequently, it is difficult for the eNB to utilize CQI/PMI information as well.

TABLE 10

| | Cell 1 | Cell 2 | Cell 3 |
|---|---|---|---|
| Condition to determine the bit widths for RI | TM4 2 antenna ports | TM 9 4 antenna ports with PMI/RI reporting max 4 layers | TM 9 8 antenna ports with PMI/RI reporting max 8 layers |
| Bit width at SF #n RI values | RI: 1 Rank = 1 | RI: 2 Rank = 1 | RI: 3 Rank = 2 |
| Bit width at SF #(n + k) | CQI/PMI = 6 | CQI/PMI = 8 | CQI/PMI = 11 |

As a different example, when RI feedback on cells 1 and 2 and CQI feedback on a cell 3 are transmitted on PUCCH in an SF #n and CQI and/or PMI feedback on cells 1 and 2 and RI feedback on a cell 3 are transmitted on PUCCH in an SF #(n+k), a bit width for each cell is shown in Table 11. When the RI feedback on cells 1 and 2 is transmitted in the SF #n, if a decoding error occurs, it is difficult for an eNB to anticipate a bit width for the CQI and/or PMI feedback on cells 1 and 2 in the SF #(n+k) and the eNB may lose RI information on the cell 3. This causes bit width ambiguity for CQI/PMI feedback on the cell 3 and it may lead to additional CSI loss.

TABLE 11

|  | Cell 1 | Cell 2 | Cell 3 |
| --- | --- | --- | --- |
| Condition to determine the bit widths for RI | TM4 2 antenna ports | TM 9 4 antenna ports with PMI/RI reporting max 4 layers | TM 9 8 antenna ports with PMI/RI reporting max 8 layers |
| Bit width at SF #n RI values | RI: 1 Rank = 1 | RI: 2 Rank = 1 | CQI/PMI = 11 — |
| Bit width at SF #(n + k) | CQI/PMI = 6 | CQI/PMI = 8 | RI: 3 |

When CSI on a plurality of cells/CSI processes are transmitted in a manner of being multiplexed, the present invention proposes a coding method according to a configuration of each CSI group and the number of bits. In this case, the CSI can be restricted to periodic CSI only except aperiodic CSI.

Determination of Separate/Joint Coding for Multiple CSI

Method of determining separate/joint coding according to each CSI

When CSI on a plurality of cells/CSI processes are multiplexed and transmitted at the same time in a specific subframe via the same channel (e.g., PUCCH or PUSCH), it may be able to determine whether to perform separate coding or joint coding on each CSI report on the basis of a part (or, a combination of parts) of rules described in the following. In this case, a rule for the separate coding or the joint coding can be defined/promised in advance or can be configured via signaling (e.g., RRC/physical layer signaling).

(Rule 1) joint coding is applied to CSIs of which a bit width is not changed according to a rank value.

(Rule 2) separate coding is applied to CSI of which a bit width is changed according to a rank value.

(Rule 3) in case of CSI of which a bit width is changed according to a rank value, if a size of a virtual input bit or a virtually coded bit (hereinafter, a coded bit) of the CSI is defined/configured in advance, it may expect the same value without misalignment between an eNB and a UE. Hence, if the number of final input bits or the number of coded bits of CSIs of which a bit width is changed according to a rank value is defined/configured in advance, joint coding is applied. Otherwise, separate coding is applied.

(Rule 4) in case of CSI of which a bit width is not changed according to a rank value, separate coding is applied to the CSI. This is because, when a plurality of CSIs are transmitted at the same time, since informations (e.g., RI, PTI, W1, etc.) influencing on information to be delivered later are included in a plurality of the CSIs, if joint coding is applied to the CSI, it may cause the loss of the information on a plurality of cells.

(Rule 5) in case of CSI of which a bit width is not changed according to a rank value, if the CSI corresponds to information (e.g., RI, PTI, W1, etc.) influencing on information to be delivered later, separate coding is applied to the CSI. Although wideband CQI only report does not influence on later CSI, since the wideband CQI only report corresponds to a CSI report of which a bit width is not changed according to a rank value, it may apply joint coding to the wideband CQI only report together with a different CSI report.

(Rule 6) in the abovementioned rules, the number of CSIs to which joint coding is applied can be restricted to a number equal to or less than a prescribed number.

Method of determining separate coding/joint coding according to a PUCCH reporting type/report mode When CSIs on a plurality of cells/CSI processes are simultaneously transmitted in a specific subframe via the same channel (e.g., PUCCH or PUSCH) in manner of being multiplexed, it may be able to define a rule that separate coding/joint coding is determined to be applied according to a PUCCH reporting type via signaling (RRC or physical layer signaling). In the following, more specific methods for the abovementioned proposal are explained.

(Rule 1) when CSI corresponds to a PUCCH reporting type of which a bit width is not changed according to a rank value, joint coding is applied to the CSI.

(Rule 2) when CSI corresponds to a PUCCH reporting type of which a bit width is changed according to a rank value, separate coding is applied to the CSI.

(Rule 3) in case of CSI corresponding to a PUCCH reporting type of which a bit width is changed according to a rank value, if a size of a virtual input bit or a virtually coded bit of the CSI is defined/configured in advance, it may expect the same value without misalignment between an eNB and a UE. Hence, if the number of final input bits or the number of coded bits of CSIs corresponding to a PUCCH reporting type of which a bit width is changed according to a rank value is defined/configured in advance, joint coding is applied. Otherwise, separate coding is applied.

(Rule 4) in case of CSI corresponding to a PUCCH reporting type of which a bit width is not changed according to a rank value, if the CSI corresponds to information (e.g., RI, PTU, W1, etc.) influencing on information to be delivered later, separate coding is applied to the CSI.

For example, in case of transmitting feedback on "wideband CQI+PMI" for a cell 1, "wideband CQI+wideband PMI" for a cell 2, "RI" for a cell 3, "wideband CQI" for a cell 4, and "RI" for a cell 5 via a single UL channel, a PUCCH reporting type corresponding to CSI of each cell corresponds to 2, 2c, 3, 4, and 6. Hence, CSI on cells 1 and 2 corresponds to a CSI report corresponding to a PUCCH reporting type of which a bit width is changed according to a rank value and CSI on cells 3, 4, and 5 corresponds to a CSI report corresponding to a PUCCH reporting type of which a bit width is not changed according to a rank value.

Figure 5:
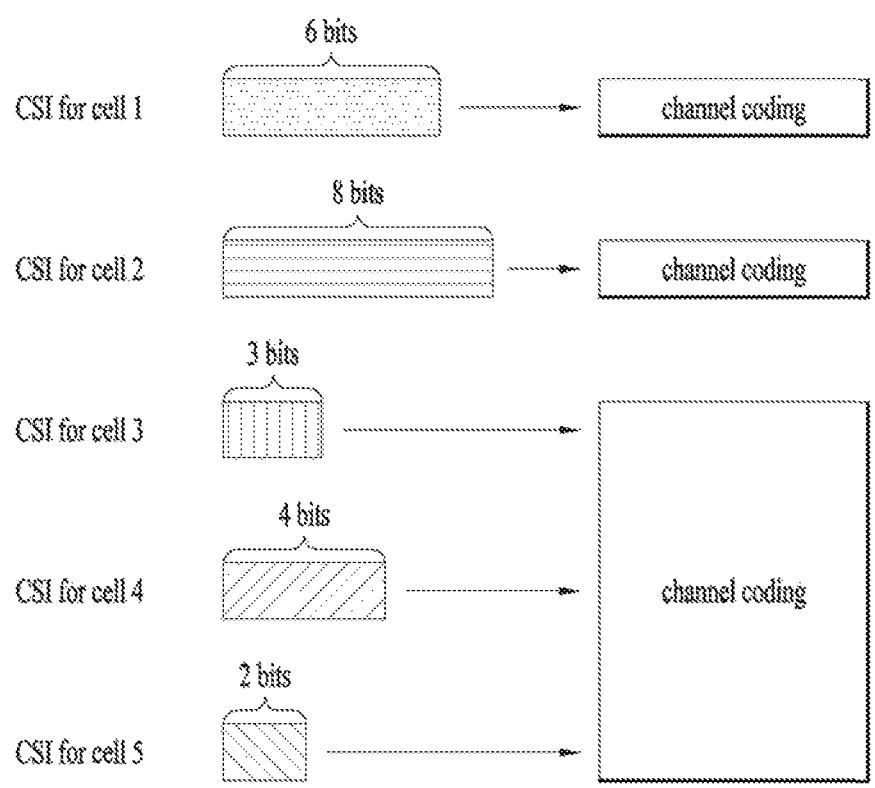
FIG. 5 is a diagram illustrating an example of applying separate coding or joint coding according to one embodiment of the present invention.

FIG. 5 illustrates an example for a case that a coding method is determined by the rules 1 and 2.

Figure 6:
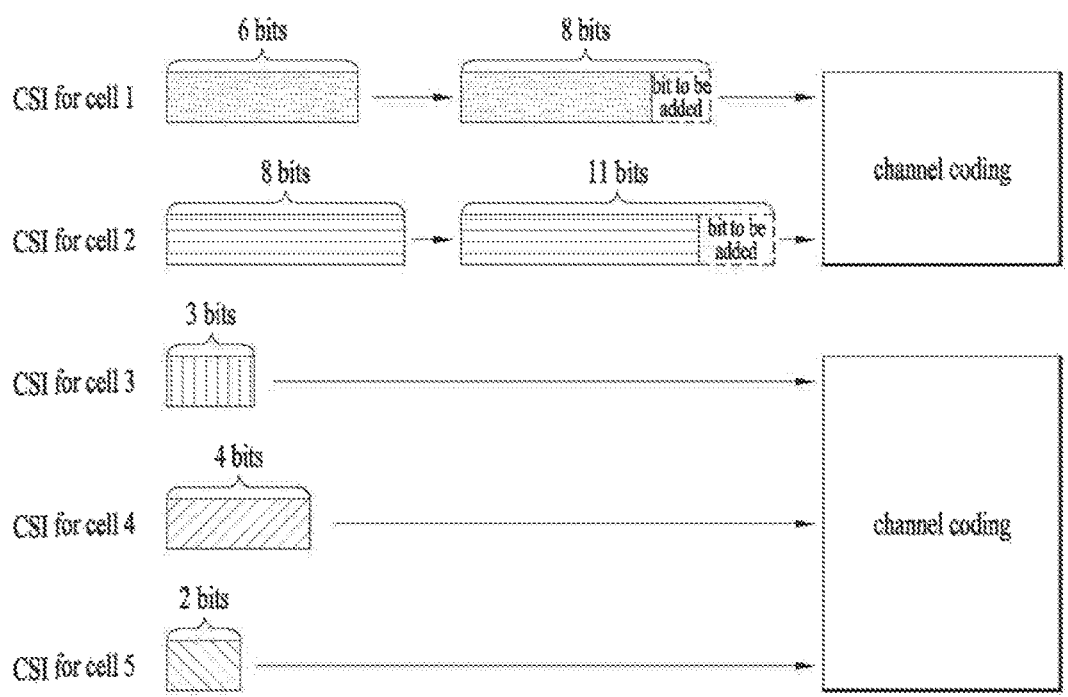
FIG. 6 is a diagram illustrating an example of applying separate coding or joint coding according to one embodiment of the present invention.

FIG. 6 illustrates an example for a case that a coding method is determined by the rules 1 and 3. In this case, although the number of bits for "wideband CQI+PMI" for a cell 1 and the number of bits for "wideband CQI+wideband PMI" for a cell 2 correspond to 6 bits and 8 bits, respectively, the number of virtual input bits is configured by 8 bits and 11 bits, respectively.

Figure 7:
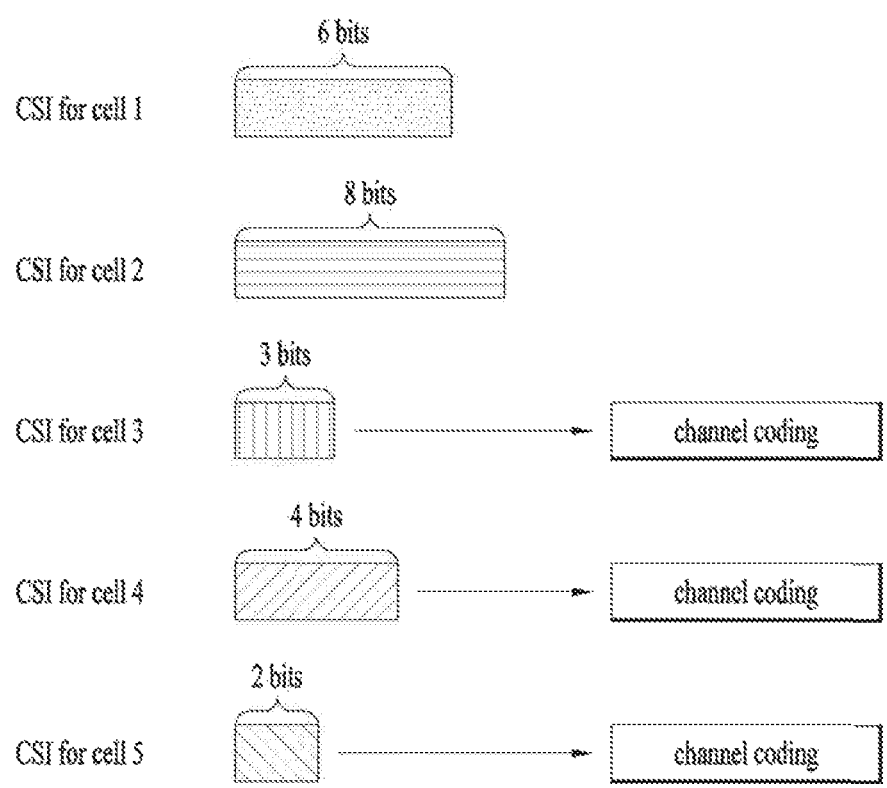
FIG. 7 is a diagram illustrating an example of applying separate coding or joint coding according to one embodiment of the present invention.

FIG. 7 illustrates an example for a case that a coding method is determined by the rule 4.

Or, when CSIs on a plurality of cells/CSI processes are simultaneously transmitted in a specific subframe via the same channel in manner of being multiplexed, it may be able to define a rule that separate coding or joint coding is determined to be applied according to a combination of a PUCCH reporting type and the number of antenna ports via signaling (RRC or physical layer signaling).

Or, when CSIs on a plurality of cells/CSI processes are simultaneously transmitted in a specific subframe via the same channel in manner of being multiplexed, it may be able to define a rule that separate coding or joint coding is determined to be applied according to a combination of all or a part of a PUCCH reporting type, a PUCCH reporting mode, and the number of antenna ports.

Method of Determining Coding Scheme According to CSI Group

According to a current LTE standard, a different coding scheme can be applied to UCI information according to an amount of input bits. For example, single RM (Reed-muller), dual RM, TBCC (tail biting convolutional coding), and the like can be selectively applied according to the amount of input bits. According to the present invention, when CSIs on a plurality of cells/CSI processes are simultaneously transmitted in a specific subframe via the same channel in manner of being multiplexed, it may be able to define a rule that a coding scheme is to be determined according to a part (or, a partial combination) of rules described in the following. In this case, the rule can be defined/promised in advance or can be configured via signaling (e.g., RRC or physical layer signaling). In this case, a set of CSIs joint coded in a manner of being grouped according to a coding block is referred to as "CSI group".

(Rule 1) if the sum of the number of CSI bits in a specific CSI group is equal to or less than a bits, single RM is applied. If the sum of the number of CSI bits exceeds the a bits, dual RM or TBCC can be applied. In this case, for example, the a may correspond to 11.

(Rule 2) if the sum of the number of CSI bits in a specific CSI group is equal to or less than a bits, single RM is applied. If the sum of the number of CSI bits exceeds the a bits and is equal to or less than b bits, dual RM is applied. If the sum of the number of CSI bits exceeds the b bits, TBCC can be applied. In this case, for example, the a may correspond to 11 and the b may correspond to 21.

(Rule 3) if the sum of the number of CSI bits in a specific CSI group exceeds a bits and one or more CSIs of specific CSI or a specific reporting type are included, dual RM is applied. Otherwise, TBCC can be applied. In this case, for example, the a may correspond to 11.

In this case, "the number of CSI bits" may correspond to "the number of virtual input bits", "the number of CSI bits to be actually transmitted", "a predefined fixed value", "a value configured via higher layer signaling or physical layer signaling", "the maximum number of CSI bits capable of being occurred", or "a specific value between the maximum number of CSI bits and the minimum number of CSI bits capable of being occurred".

CRC Generation and Attachment

When CSIs on a plurality of cells/CSI processes are simultaneously transmitted in a specific subframe via the same channel in manner of being multiplexed, it may be able to individually generate and attach a CRC bit to a CSI payload corresponding to each CSI group. A coded bit for each CSI group can be transmitted in a manner of being mapped to a different resource (e.g., RE) in PUCCH or PUSCH.

And, when CSIs on a plurality of cells/CSI processes are simultaneously transmitted in a specific subframe via the same channel (e.g., PUCCH or PUSCH) in manner of being multiplexed, it may be able to individually generate and attach a CRC bit to CSI corresponding to a specific PUCCH reporting type. Or, a single CRC bit can be generated and attached to CSIs corresponding to a partial specific PUCCH reporting type. In this case, it may be able to define/promise in advance that CSI of a specific PUCCH reporting type to which a CRC is generated and attached may correspond to RI of a high protection priority and/or CQI/PMI of which a bit width has ambiguity.

FIG. 8 is a flowchart illustrating an operation according to one embodiment of the present invention.

FIG. 8 illustrates a method of performing channel coding on channel state information in a wireless communication system. The method can be performed by a terminal.

The terminal may determine whether to perform separate coding or joint coding of multi-CSI for a plurality of cells or CSI processes to be transmitted in a subframe [S810]. The terminal may perform channel coding of input bits for the multi-CSI according to the determined coding scheme [S820]. In this case, whether to perform the separate coding or the joint coding may be determined according to a rule configured per individual CSI, per physical uplink control channel (PUCCH) reporting type, or per PUCCH reporting mode.

When whether to perform the separate coding or the joint coding is determined according to a rule set for each individual CSI, a type of CSI having a bit width being changed according to a rank value of a downlink channel, may be separately coded. A type of CSIs having a bit width being not changed according to a rank value of a downlink channel may be jointly coded.

When whether to perform the separate coding or the joint coding is determined according to a rule configured per individual CSI, a type of CSI having the number of final input bits for a channel coder or the number of coded bits being pre-configured and having a bit width being changed according to a rank value of a downlink channel may be jointly coded. A type of CSI having the number of final input bits for a channel coder or the number of coded bits being not pre-configured and having a bit width being changed according to a rank value of a downlink channel may be separately coded.

When whether to perform the separate coding or the joint coding is determined according to a rule configured per individual CSI, a type of CSI having a bit width being not changed according to a rank value of a downlink channel, which is simultaneously transmitted with a different CSI having a bit width being changed according to a rank value of a downlink channel, may be jointly coded. A type of CSI having a bit width being not changed according to a rank value of a downlink channel, which affects information to be delivered later, may separately coded.

When whether to perform the separate coding or the joint coding is determined according to a rule configured per PUCCH reporting type or per PUCCH reporting mode, a PUCCH reporting type of CSI or a PUCCH reporting mode of CSI of which a bit width is changed according to a rank value of a downlink channel may be separately coded. A PUCCH reporting type of CSI or a PUCCH reporting mode of CSI of which a bit width is not changed according to a rank value of a downlink channel may be jointly coded.

When whether to perform the separate coding or the joint coding is determined according to a rule configured per PUCCH reporting type or per PUCCH reporting mode, a PUCCH reporting type of CSI or a PUCCH reporting mode of CSI having the number of final input bits for a channel coder or the number of coded bits being pre-configured and having a bit width being changed according to a rank value of a downlink channel may be jointly coded. A PUCCH reporting type of CSI or a PUCCH reporting mode of CSI having the number of final input bits for a channel coder or the number of coded bits being not pre-configured and having a bit width being changed according to a rank value of a downlink channel may be separately coded.

When whether to perform the separate coding or the joint coding is determined according to a rule configured per PUCCH reporting type or per PUCCH reporting mode, a type of CSI having a bit width being not changed according to a rank value of a downlink channel, which is simultaneously transmitted with a different CSI having a bit width being changed according to a rank value of a downlink channel, may be jointly coded. A type of CSI having a bit width being not changed according to a rank value of a downlink channel, which affects information to be delivered later, may be separately coded.

Whether to perform the separate coding or the joint coding can be determined according to a rule configured per combination of all or a part of a PUCCH reporting type, a PUCCH reporting mode, and the number of antenna ports.

In the foregoing description, embodiments of the present invention have been briefly explained with reference to FIG. 8. An embodiment related to FIG. 8 can alternatively or additionally include at least a part of the aforementioned embodiments.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

FIG. 9 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method of performing channel coding of channel state information (CSI) in a wireless communication system, the method performed by a terminal and comprising:
   determining whether to perform separate coding or joint coding of multi-CSI for a plurality of cells or a CSI process to be transmitted in a subframe; and
   performing channel coding of input bits for the multi-CSI according to the determined coding scheme,
   wherein whether to perform the separate coding or the joint coding is determined according to a rule configured per individual CSI, a rule configured per physical uplink control channel (PUCCH) reporting type, or a rule configured per PUCCH reporting mode, and
   wherein when whether to perform the separate coding or the joint coding is determined according to the rule configured per PUCCH reporting type or the rule configured per PUCCH reporting mode, an individual cyclic redundancy check (CRC) bit is attached to each of CSIs corresponding to a part of PUCCH reporting types or a part of PUCCH reporting modes.

2. The method of claim 1, wherein when whether to perform the separate coding or the joint coding is determined according to the rule configured per individual CSI, a type of CSI having a bit width being changed according to a rank value of a downlink channel is separately coded, and a type of CSIs having a bit width being not changed according to a rank value of a downlink channel is jointly coded.

3. The method of claim 1, wherein when whether to perform the separate coding or the joint coding is determined according to the rule configured per individual CSI, a type of CSI having the number of final input bits for a channel coder or the number of coded bits being preconfigured, and having a bit width being changed according to a rank value of a downlink channel is jointly coded, and a type of CSI having the number of final input bits for a channel coder or the number of coded bits being not preconfigured and having a bit width being changed according to a rank value of a downlink channel is separately coded.

4. The method of claim 1, wherein when whether to perform the separate coding or the joint coding is determined according to the rule configured per individual CSI, a type of CSI having a bit width being not changed according to a rank value of a downlink channel, which is simultaneously transmitted with a different CSI having a bit width being changed according to a rank value of a downlink channel, is jointly coded, and a type of CSI having a bit width being not changed according to a rank value of a downlink channel, which affects information to be delivered later, is separately coded.

5. The method of claim 1, wherein when whether to perform the separate coding or the joint coding is determined according to the rule configured per PUCCH reporting type or the rule configured per PUCCH reporting mode, a PUCCH reporting type of CSI or a PUCCH reporting mode of CSI of which a bit width is changed according to a rank value of a downlink channel is separately coded, and a PUCCH reporting type of CSI or a PUCCH reporting mode of CSI of which a bit width is not changed according to a rank value of a downlink channel is jointly coded.

6. The method of claim 1, wherein when whether to perform the separate coding or the joint coding is determined according to the rule configured per PUCCH reporting type or the rule configured per PUCCH reporting mode, a PUCCH reporting type of CSI or a PUCCH reporting mode of CSI having the number of final input bits for a channel coder or the number of coded bits being preconfigured and having a bit width being changed according to a rank value of a downlink channel is jointly coded, and a PUCCH reporting type of CSI or a PUCCH reporting mode of CSI having the number of final input bits for a channel coder or the number of coded bits being not preconfigured and having a bit width being changed according to a rank value of a downlink channel is separately coded.

7. The method of claim 1, wherein when whether to perform the separate coding or the joint coding is determined according to the rule configured per PUCCH reporting type or the rule configured per PUCCH reporting mode, a type of CSI having a bit width being not changed according to a rank value of a downlink channel, which is simultaneously transmitted with a different CSI having a bit width being changed according to a rank value of a downlink channel, is jointly coded, and a type of CSI having a bit width being not changed according to a rank value of a downlink channel, which affects information to be delivered later, is separately coded.

8. The method of claim 1, wherein whether to perform the separate coding or the joint coding is determined according to a rule configured per combination of all or a part of a PUCCH reporting type, a PUCCH reporting mode, and the number of antenna ports.

9. A terminal configured to perform channel coding of channel state information (CSI) in a wireless communication system, the terminal comprising:
   a transmitter and a receiver; and
   a processor that controls the transmitter and the receiver,
   wherein the processor determines whether to perform separate coding or joint coding of multi-CSI for a plurality of cells or a CSI process to be transmitted in a subframe, and performs channel coding of input bits for the multi-CSI according to the determined coding scheme,
   wherein whether to perform the separate coding or the joint coding is determined according to a rule configured per individual CSI, a rule configured per physical uplink control channel (PUCCH) reporting type, or a rule configured per PUCCH reporting mode, and
   wherein when whether to perform the separate coding or the joint coding is determined according to the rule configured per PUCCH reporting type or the rule configured per PUCCH reporting mode, an individual cyclic redundancy check (CRC) bit is attached to each of CSIs corresponding to a part of PUCCH reporting types or a part of PUCCH reporting modes.

10. The terminal of claim 9, wherein when whether to perform the separate coding or the joint coding is determined according to the rule configured per individual CSI, a type of CSI having a bit width being changed according to a rank value of a downlink channel is separately coded, and a type of CSIs having a bit width being not changed according to a rank value of a downlink channel is jointly coded.

11. The terminal of claim 9, wherein when whether to perform the separate coding or the joint coding is determined according to the rule configured per individual CSI, a type of CSI having the number of final input bits for a channel coder or the number of coded bits being pre-configured and having a bit width being changed according to a rank value of a downlink channel is jointly coded, and a type of CSI having the number of final input bits for a channel coder or the number of coded bits being not pre-configured and having a bit width being changed according to a rank value of a downlink channel is separately coded.

12. The terminal of claim 9, wherein when whether to perform the separate coding or the joint coding is determined according to the rule configured per individual CSI, a type of CSI having a bit width being not changed according to a rank value of a downlink channel, which is simultaneously transmitted with a different CSI having a bit width being changed according to a rank value of a downlink channel, is jointly coded, and a type of CSI having a bit width being not changed according to a rank value of a downlink channel, which affects information to be delivered later, is separately coded.

13. The terminal of claim 9, wherein when whether to perform the separate coding or the joint coding is determined according to the rule configured per PUCCH reporting type or the rule configured per PUCCH reporting mode, a PUCCH reporting type of CSI or a PUCCH reporting mode of CSI of which a bit width is changed according to a rank value of a downlink channel is separately coded, and a PUCCH reporting type of CSI or a PUCCH reporting mode of CSI of which a bit width is not changed according to a rank value of a downlink channel is jointly coded.

14. The terminal of claim 9, wherein when whether to perform the separate coding or the joint coding is determined according to the rule configured per PUCCH reporting type or the rule configured per PUCCH reporting mode, a PUCCH reporting type of CSI or a PUCCH reporting mode of CSI having the number of final input bits for a channel coder or the number of coded bits being pre-configured and having a bit width being changed according to a rank value of a downlink channel is jointly coded, and a PUCCH reporting type of CSI or a PUCCH reporting mode of CSI having the number of final input bits for a channel coder or the number of coded bits being not pre-configured and a bit width being changed according to a rank value of a downlink channel is separately coded.

15. The terminal of claim 9, wherein when whether to perform the separate coding or the joint coding is determined according to the rule configured per PUCCH reporting type or the rule configured per PUCCH reporting mode, a type of CSI having a bit width being not changed according to a rank value of a downlink channel, which is simultaneously transmitted with a different CSI having a bit width being changed according to a rank value of a downlink channel, is jointly coded, and a type of CSI having a bit width being not changed according to a rank value of a downlink channel, which affects information to be delivered later, is separately coded.

16. The terminal of claim 9, wherein whether to perform the separate coding or the joint coding is determined according to a rule configured per combination of all or a part of a PUCCH reporting type, a PUCCH reporting mode, and the number of antenna ports.

* * * * *